US009075917B2

(12) United States Patent
Alper et al.

(10) Patent No.: US 9,075,917 B2
(45) Date of Patent: Jul. 7, 2015

(54) TESTING FRAMEWORK FOR DYNAMIC WEB PAGES

(75) Inventors: Okan Alper, Redwood City, CA (US); Jayadev Chandrasekhar, Sunnyvale, CA (US); Parag Jain, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 90 days.

(21) Appl. No.: 13/620,791

(22) Filed: Sep. 15, 2012

(65) Prior Publication Data

US 2014/0082593 A1 Mar. 20, 2014

(51) Int. Cl.
*G06F 9/44* (2006.01)
*G06F 11/36* (2006.01)

(52) U.S. Cl.
CPC ................... *G06F 11/3672* (2013.01)

(58) Field of Classification Search
USPC .......................................................... 717/126
See application file for complete search history.

(56) References Cited

U.S. PATENT DOCUMENTS

| 6,484,315 | B1 * | 11/2002 | Ziese ............................ 717/173 |
| 6,907,546 | B1 * | 6/2005 | Haswell et al. ................. 717/126 |
| 7,975,000 | B2 * | 7/2011 | Dixon et al. .................... 709/203 |
| 8,055,470 | B2 * | 11/2011 | Thampy et al. ................ 702/179 |
| 8,266,305 | B2 * | 9/2012 | Sherman et al. ............... 709/229 |
| 8,782,609 | B2 * | 7/2014 | Robinson ....................... 717/127 |
| 8,819,630 | B2 * | 8/2014 | Chen et al. ..................... 717/127 |
| 2001/0012986 | A1 * | 8/2001 | Conan et al. ................... 702/188 |
| 2007/0271370 | A1 * | 11/2007 | Kehl ............................... 709/224 |
| 2008/0275980 | A1 * | 11/2008 | Hansen ........................... 709/224 |
| 2011/0029902 | A1 * | 2/2011 | Bailey ............................ 715/764 |
| 2011/0161825 | A1 * | 6/2011 | Tierney et al. ................. 715/736 |
| 2013/0030868 | A1 * | 1/2013 | Lyon et al. ..................... 705/7.33 |

OTHER PUBLICATIONS

Ramaswamy et al., "Automatic Detection of Fragments in Dynamically Generated Web Pages", May 17-22, 2004, ACM.*
Backstrom et al, "Network Bucket Testing", Mar. 28-Apr. 1, 2011, ACM.*
Wu et al., "Prediction of Web Page Accesses by Proxy Server Log", 2002, Kluwer Academic Publishers.*
Luke Wroblewski, "Granular Bucket Testing," LukeW Ideation & Design, Jul. 13, 2006, Web publication.

* cited by examiner

*Primary Examiner* — Anna Deng
*Assistant Examiner* — Junchun Wu
(74) *Attorney, Agent, or Firm* — Cooper Legal Group, LLC

(57) ABSTRACT

A system and method for bucket testing includes: retrieving a user's information from a user in a bucket testing group when a request to serve a web page is received; determining from the user's information if the user has an active bucket identifier associated with the user's account in a persistent store; retrieving bucket parameters from the user's information when it is determined that the user has an active bucket identifier; determining if the bucket parameters are within a range assigned to the bucket testing group; passing the bucket parameters to the server; and loading configuration and files associated with the active bucket identifier.

15 Claims, 3 Drawing Sheets

TESTING FRAMEWORK FOR DYNAMIC WEB PAGES

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of bucket testing, and more particularly relates to the field of bucket testing for dynamic web pages.

BACKGROUND OF THE INVENTION

Bucket testing, otherwise known as A/B testing, is in widespread use for testing web site product design. In one methodology, two different versions of a web site are run simultaneously to a selected bucket of users. Then, user traffic and activity are measured and the difference is noted to determine which design is preferred. One drawback to this method is that different users use different browsers. Assume we want to test a new feature specifically created for a bucket (a bucketed feature). Let's say we are testing the effectiveness of a new user interface (UI) interaction in a module in a specific bucket.

For example, we might want to test a new hover interaction in a module; i.e., when the user moves the mouse over that module something in the background changes. This feature might require a specific JavaScript library supported by most browsers with the exception of IE-6; in which case a random user who is assigned to this new bucket but using IE-6 will have a broken experience. To avoid that scenario, normally we introduce specific browser filters for each bucket so that only browsers which have capability to display that feature would fall into that bucket.

There is a need, however, for a system and method for better management of bucket testing.

SUMMARY OF THE INVENTION

Briefly, according to an embodiment of the invention a method for bucket testing includes steps or acts of: retrieving a user's information from a user in a bucket testing group when a request to serve a web page is received; determining from the user's information if the user has an active bucket identifier associated with said user's account in a persistent store; retrieving bucket parameters from the user's information when it is determined that the user has an active bucket identifier; determining if the bucket parameters are within a range assigned to the bucket testing group; passing the bucket parameters to the server; and loading configuration and files associated with the active bucket identifier.

According to another embodiment of the present invention, a computer program product includes a non-transitory computer readable storage medium with computer-executable instructions stored therein. The computer-executable instructions include: retrieving a user's information from a user in a bucket testing group when a request to serve a web page is received; determining from the user's information if the user has an active bucket identifier associated with said user's account in a persistent store; retrieving bucket parameters from the user's information when it is determined that the user has an active bucket identifier; determining if the bucket parameters are within a range assigned to the bucket testing group; passing the bucket parameters to the server; and loading configuration and files associated with the active bucket identifier.

According to another embodiment of the present invention, an information processing system includes a memory, a processor device operably coupled with the memory, and a persistent store. The memory includes the computer-executable instructions recited above for bucket testing.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which.

Figure 1:
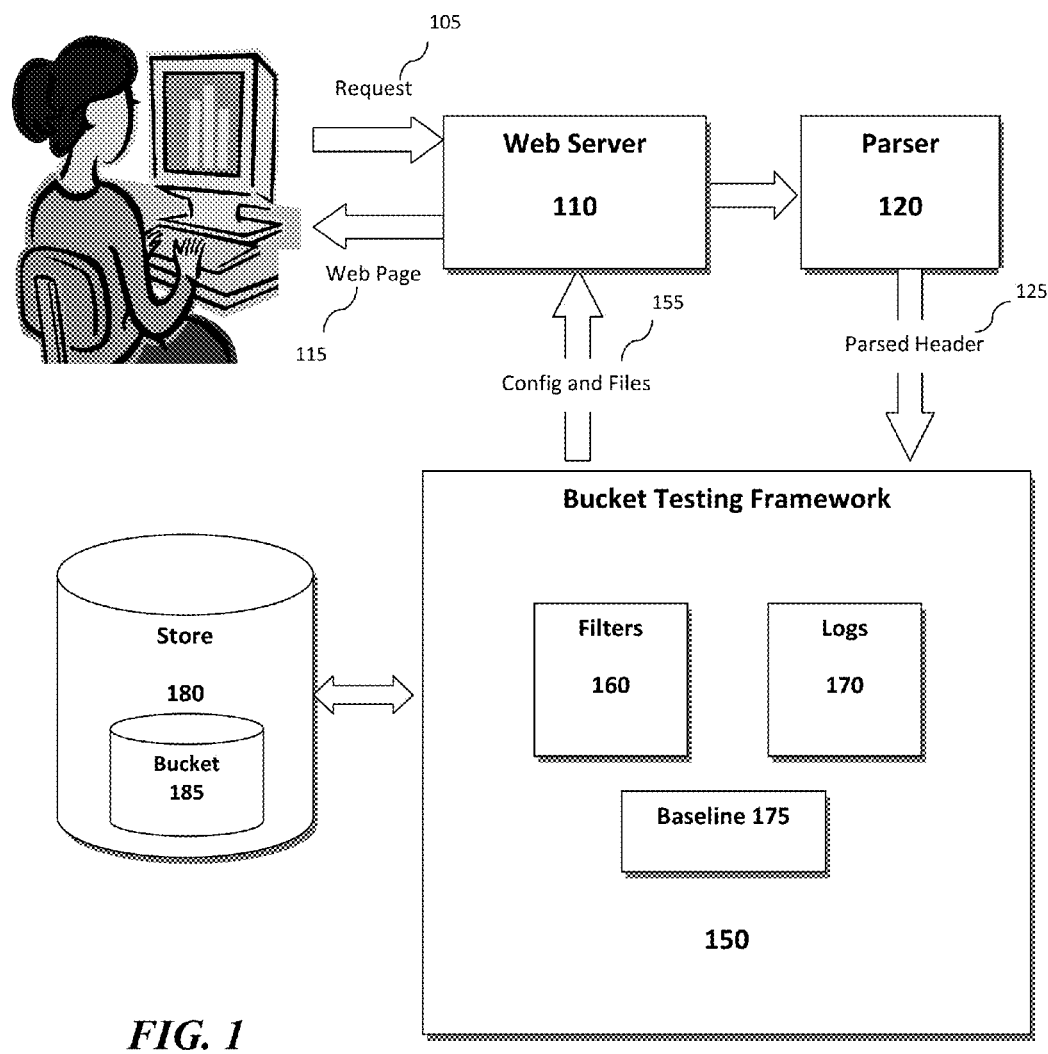
FIG. 1 is a simplified depiction of an information processing system in which the present invention may operate, according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present invention, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We describe a unified framework providing the end-to-end capabilities of testing designs, along with tracking, managing, and reporting capabilities over both the short term and long term. Throughout this discussion, we focus our examples on bucketed features. By 'bucketed feature' we mean the features (or different UI aspects) which are bucket tested or added as part of a specific bucket. The method according to the invention is very critical to data driven decisions for determining which design is preferred by most users. It also provides a way to measure long term impact of the test and not just the short term user behavior at the time the test was running It also provides an easy way to configure/run and measure tests.

To make decisions about different designs being tested, there needs to be a unified framework which provides the end-to-end capabilities of not only testing out various designs, but also tracking and reporting capabilities over the short long term for users. This framework provides consumers the ability to configure, test, and measure various different tests for users along with providing a common way of instrumenting the data for further analytics. The framework provides support for the following features: a) browser-based filtering; b) cookie selection and exclusion; c) custom filtering; d) bucket overriding; e) module configuration selection; and f) long term tracking.

a) Browser based Filtering (browser tests). In general, bucketed features are restricted to certain browsers and in some cases to a specific white list of browsers. This is to make sure that the users on the other, non-supported, browsers do not have a bad experience because of bucketed features, which may not have been thoroughly tested for those non-supported browsers. Examples of browser filters:

1. All browsers.
2. IE7/8/FF3.5/FF3 browsers.
3. FF3.6+, IE7/8/9 Chrome, Safari browsers b) Cookie selection and exclusion. We make sure that the user's cookie is sticky to the bucket, meaning that the cookie contains the values pertaining to that bucket, in order to provide a consistent experience to that user during bucket testing. A cookie is stored on the visitor's computer. It contains values of parameters, such as name and date. Additionally, we make sure that two buckets do not have overlapping cookie ranges so that we can gauge the impact of a feature in a meaningful way. It is also required that the new buckets are introduced to the least tested users in this manner.

c) Custom filtering. Bucket features can be based on custom filters, such as page width being narrow or wide. We provide a mechanism to communicate custom filters to the bucketing system, which can be used to make a decision to include/exclude a user from a bucket in addition to filtering by cookie ranges. We able to add new filters to accommodate different criteria. For example, there can be many new filters defined due to business/technical/governmental reasons which may have to be applied in addition to standard filters. One such example is whether the user is using a wide or narrow version of the page. For example if the user is using the narrow version of the page and the bucket feature is a enhancement which works only on the wide version of the page, then that user should be excluded from the bucket. In fact we cannot really foresee all such filters; therefore we provide a placeholder where we can put in a new filter rule for each bucket before the user is assigned to the bucket.

Some examples of custom filters:

1. Certain Cookies that are hashed differently because of dependency on other property features.
2. Feature users, such as BT (Behavior Targeting) profile users may also be excluded from the bucket testing. It may primarily be required for contractual reasons. For example, all the users coming through the Yahoo! site are put into multiple BT profiles (a user could be part of multiple such profiles) typically used by advertisers for targeting. Some BT profiles may have to be excluded from some bucket test due to contractual obligations. For example, a user already in Microsoft search bucket profile shouldn't be shown specific ad formats.

d) Bucket Overriding. We enable testing of a bucket feature by forcing a request into the bucket using both query parameters as well as an HTTP header. We can also turn off a bucket's parameters for overriding.

e) Module configuration/selection.
  1) The bucket may be specific to certain module features, in which case the module should be able to create configuration values that are based on the bucket context.
  2) We are able to select a different set of modules to bucket features at the layout level. Just like one of the bucket filters in current use is a browser filter, another bucket filter can be the user's device. For example, if there is a rich JavaScript-based feature being bucket tested, then a user coming from a mobile device should be excluded from the test since the feature may not function properly in a mobile device. Similarly, a flash-based feature working on an Android smart phone may not work well in an iPhone and we may have to exclude iPhone users from being tests involving the flash feature.

f) Long Term tracking of the user if needed. We support persistent bucketing to track long term effect and engagement of users after the bucket period has ended. Our bucketing framework is configurable for a certain time period after which the data should be cleaned from the user's record.

Bucket Testing Framework.

Referring now in detail to the drawings and to FIG. 1 in particular, we show a system 100 in which the bucket testing framework operates, according to an embodiment of the present invention. The main components of this system are: the Web Server 110, the Parser 120, the Bucket Testing Framework 150, and Storage 180.

A computer user, using any type of device that is capable of storing digital media and has Internet access, sends a web request 105 to a Web Server 110. The Web Server 110 receives this request 105 and hands it over to a Parser 120 to parse the header. The Parser 120 sends the parsed header 125 to the Bucket Testing Framework 150 for processing. Note that the parsed header 125 contains the cookie ID of the user's device. The Framework 150 processes the header 125 and returns the configuration files 155 to the Web Server 110 which in turn serves the web page 115 to the user.

Bucket Testing Procedure.

Figure 2:
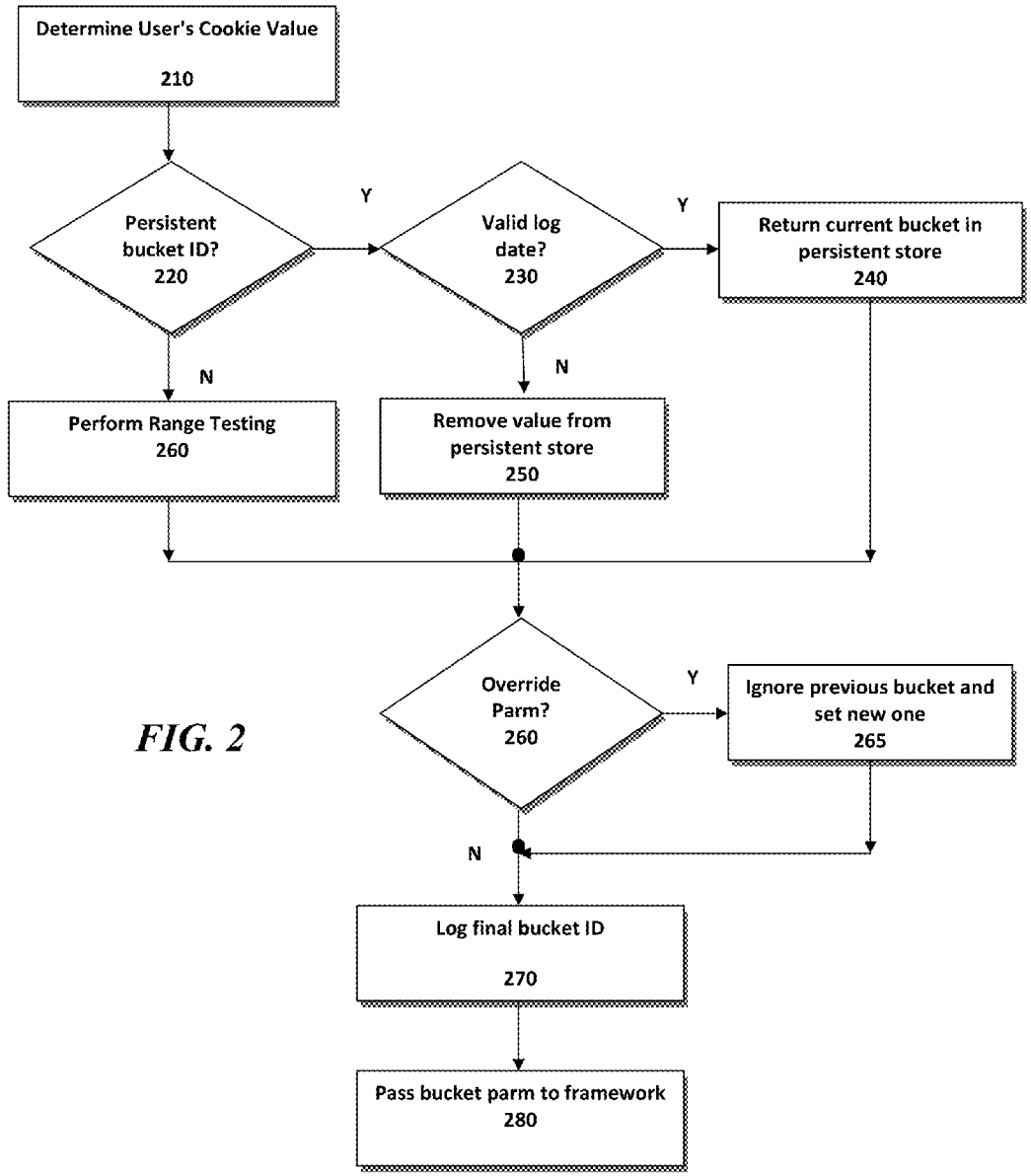
FIG. 2 is a flowchart of a method according to an embodiment of the invention.

The bucketing framework runs as soon as the request headers are parsed in a request to serve a web page 115. Referring now to FIG. 2, we show a flow chart 200 for the bucket testing method according to an embodiment of the present invention. First in step 210, once the request 105 for a page 115 is received and the request headers are parsed, we determine and store the user's cookie value and then we run the following steps:

In step 220 we determine if the user has a persistent bucket ID associated with his account in a persistent store 180. If there is a bucket ID associated with the cookie and that bucket still has a valid log date as determined in step 230, we note the value of the bucket ID in the logs 170 and return the current bucket ID as the one in the persistent store 180 in step 240; ELSE if the bucket ID associated with this user's current bucket does not have a valid log date, we remove the bucket ID value from the persistent store 180 in step 250.

If in step 220 it is determined that there is no bucket ID associated with the user's cookie, in step 260 we perform bucket range testing. This involves checking to determine if the user falls within a bucket range for a given bucket. If the user falls within a bucket range, we perform a browser test and a custom exclusion test for the user. If all of the tests succeed, we place the user in the bucket. If all of the above tests fail, we place the user in the baseline. Normally if the user doesn't fall into any of the special buckets or fails one of the filter tests defined for a bucket, then he/she is put into the default bucket (where most users belong) which is called baseline 175. It is called baseline because more often the performance of users in each bucket is compared against the default bucket and hence it forms the baseline for comparison.

The idea behind these tests is that every user has a cookie and buckets are created based on a cookie range. So when a user visits the page, we first check whether his/her cookie falls into one of the predefined bucket ranges. If so, he/she is a potential candidate to be put into the corresponding bucket. Now we define further filters on the bucket which the user has to pass through before he/she can be successfully placed in the bucket and that is where the browser test and other custom exclusion tests come in.

In step 260 we then determine if there is an override parameter set (through the URL or else we query an additional cookie). If there is, then in step 265, we ignore the previously determined bucket ID and set the new bucket ID. ELSE in step 270 we log the final bucket ID in the log file for tracking purposes. If the bucket is configured as a persistent bucket, we then add this to the persistent store for the user. Lastly in step 280 we pass the bucket parameters to the application framework and load the configuration and files associated with this bucket ID.

Hardware Embodiment

Figure 3:
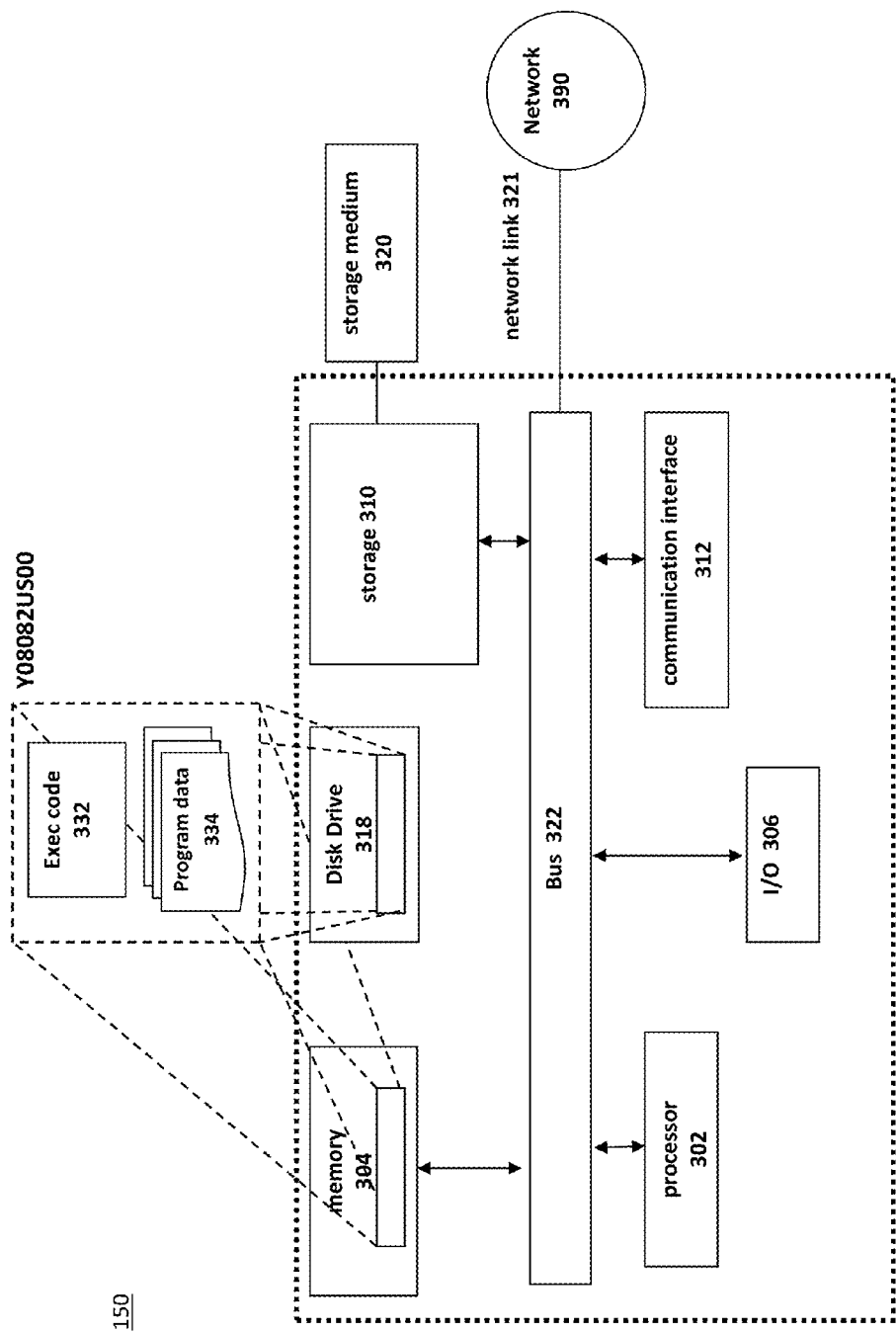
FIG. 3 is a simplified block diagram of the hardware required to implement the method of FIG. 2, according to an embodiment of the present invention.

Referring now to the drawings and to FIG. 3, there is provided a simplified high-level block diagram of the Bucket Testing Framework 150 for implementing bucket testing of dynamic web pages, according to embodiments of the present invention. For purposes of this invention, the Bucket Testing Framework 150 may represent any type of computer, information processing system or other programmable electronic device operable for storing digital data, including a client computer, a server computer, a portable computer, an embedded controller, a tablet computer, Internet TV, a Cloud device, a personal digital assistant, and so on. The Framework 150 may be a stand-alone device or networked into a larger system. Framework 150, illustrated for exemplary purposes as a networked computing device, is in communication with other networked computing devices such as Web Server 110 (not shown) via network 390. As will be appreciated by those of ordinary skill in the art, network 390 may be embodied using conventional networking technologies and may include one or more of the following: local area networks, wide area networks, intranets, public Internet and the like.

Throughout the description herein, an embodiment of the invention is illustrated with aspects of the invention embodied solely on Framework 150, for simplicity. As will be appreciated by those of ordinary skill in the art, aspects of the invention may be distributed among one or more networked computing devices which interact with Framework 150 via one or more data networks such as, for example, network 390. However, for ease of understanding, aspects of the invention have been described as embodied in a single computing device—Framework 150.

Framework 150 includes processing device 302 which communicates with an input/output subsystem 306, memory 304, storage 310 and network 390. The processor device 302 is operably coupled with a communication infrastructure 322 (e.g., a communications bus, cross-over bar, or network). The processor device 302 may be a general or special purpose microprocessor operating under control of computer program instructions 332 executed from memory 304 on program data 334. The processor 302 may include a number of special purpose sub-processors such as a comparator engine, each sub-processor for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips.

The memory 304 may be partitioned or otherwise mapped to reflect the boundaries of the various memory subcomponents. Memory 304 may include both volatile and persistent memory for the storage of: operational instructions 332 for execution by processor device 302, data registers, application storage and the like. Memory 304 may include a combination of random access memory (RAM), read only memory (ROM) and persistent memory such as that provided by a hard disk drive 318. The computer instructions/applications that are stored in memory 304, such as instructions for implementing the steps of FIG. 2, are executed by processor 302. The computer instructions/applications 332 and program data 334 can also be stored in hard disk drive 318 for execution by processor device 302.

Those skilled in the art will appreciate that the functionality implemented within the blocks illustrated in the diagram may be implemented as separate components or the functionality of several or all of the blocks may be implemented within a single component. The I/O subsystem 306 may include various end user interfaces such as a display, a keyboard, and a mouse. The I/O subsystem 306 may further comprise a connection to a network 390 such as a local-area network (LAN) or wide-area network (WAN) such as the Internet.

The Framework 150 may also include storage 310, representing a magnetic tape drive, an optical disk drive, a CD-ROM drive, and the like. The storage drive 310, which can be removable, reads from and/or writes to a removable storage unit 320 in a manner well known to those having ordinary skill in the art. Removable storage unit 320, represents a compact disc, magnetic tape, optical disk, CD-ROM, DVD-ROM, etc. which is read by and written to by removable storage drive 310. As will be appreciated, the removable storage unit 320 includes a non-transitory computer readable medium having stored therein computer software and/or data for implementing the real-time feedback collection system.

The Framework 150 may also include a communications interface 312. Communications interface 312 allows software and data to be transferred between the computer system and external devices. Examples of communications interface 312 may include a modem, a network interface (such as an Ethernet card), a communications port, a PCMCIA slot and card, etc. Software and data transferred via communications interface 312 are in the form of signals which may be, for example, electronic, electromagnetic, optical, or other signals capable of being received by communications interface 312.

Therefore, while there has been described what is presently considered to be the preferred embodiment, it will understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

We claim:

1. A method for bucket testing, comprising:
using a processor device, performing steps of:
retrieving a user's information from a user in a bucket testing group when a request to serve a web page is received;
determining from the user's information whether the user has an active bucket identifier associated with said user's account in a persistent store;
when it is determined that the user has an active bucket identifier associated with said user's account in the persistent store, performing:
retrieving bucket parameters from the user's information;
determining that a bucket associated with the user has a valid log date;
noting a value of the bucket ID in a log; and
returning the bucket ID of the bucket with the valid log date as a current bucket ID in the persistent store when it is determined that said bucket has a valid log date;
else;
when it is determined that the user does not have an active bucket identifier associated with said user's account in the persistent store, performing bucket range testing to determine if the retrieved bucket parameters are within a range assigned to the bucket testing group;
passing the retrieved bucket parameters to the server; and
loading configuration and files associated with the active bucket identifier.

2. The method of claim 1 further comprising an initial step of receiving a parsed header of the request, wherein said parsed header comprises the user's information.

3. The method of claim 1 wherein performing bucket range testing comprises performing a browser filter test and a custom exclusion test when it is determined that the user falls within a bucket range.

4. The method of claim 1 further comprising: removing the bucket ID value from the persistent store when it is determined that the bucket does not have a valid log date.

5. The method of claim 1 wherein retrieving the user's information comprises retrieving a cookie associated with said user.

6. An information processing system for bucket testing, comprising:
a memory with computer-executable instructions stored therein, said computer-executable instructions comprising:
retrieving a user's information from a user in a bucket testing group when a request to serve a web page is received;
determining from the user's information whether the user has an active bucket identifier associated with said user's account in a persistent store;
when it is determined that the user has an active bucket identifier associated with said user's account in the persistent store, performing:
retrieving bucket parameters from the user's information;
determining that a bucket associated with the user has a valid log date;
noting a value of the bucket ID in a log; and
returning the bucket ID of the bucket with the valid log date as a current bucket ID in the persistent store when it is determined that said bucket has a valid log date;
else;
when it is determined that the user does not have an active bucket identifier associated with said user's account in the persistent store, performing bucket range testing to determine if the retrieved bucket parameters are within a range assigned to the bucket testing group;
passing the retrieved bucket parameters to the server; and
loading configuration and files associated with the active bucket identifier; and
a processor device executing the computer-executable instructions.

7. The information processing system of claim 6 further comprising the persistent store.

8. The information processing system of claim 6 wherein the computer-executable instructions further comprise an initial step of receiving a parsed header of the request, wherein said parsed header comprises the user's information.

9. The information processing system of claim 6 wherein the computer-executable instructions for performing bucket range testing comprise: performing a browser filter test and a custom exclusion test when it is determined that the user falls within a bucket range.

10. The information processing system of claim 6 wherein the computer-executable instructions further comprise: removing the bucket ID value from the persistent store when it is determined that the bucket does not have a valid log date.

11. The information processing system of claim 6 wherein retrieving the user's information comprises retrieving a cookie associated with said user.

12. A computer program product comprising a non-transitory computer readable storage medium with computer executable instructions stored thereon, said computer-executable instructions comprising:
retrieving a user's information from a user in a bucket testing group when a request to serve a web page is received;
determining from the user's information whether the user has an active bucket identifier associated with said user's account in a persistent store;
when it is determined that the user has an active bucket identifier associated with said user's account in the persistent store, performing:
retrieving bucket parameters from the user's information;
determining that a bucket associated with the user has a valid log date;
noting a value of the bucket ID in a log; and
returning the bucket ID of the bucket with the valid log date as a current bucket ID in the persistent store when it is determined that said bucket has a valid log date;
else
when it is determined that the user does not have an active bucket identifier associated with said user's account in the persistent store, performing bucket range testing to determine if the retrieved bucket parameters are within a range assigned to the bucket testing group;

passing the retrieved bucket parameters to the server; and loading configuration and files associated with the active bucket identifier.

13. The computer program product of claim 12 wherein the computer-executable instructions further comprise an initial step of receiving a parsed header of the request, wherein said parsed header comprises the user's information.

14. The computer program product of claim 12 wherein the computer-executable instructions for performing bucket range testing comprise: performing a browser filter test and a custom exclusion test when it is determined that the user falls within a bucket range.

15. The computer program product of claim 12 wherein the computer-executable instructions further comprise: removing the bucket ID value from the persistent store when it is determined that the bucket does not have a valid log date.

* * * * *